US006603290B2

(12) United States Patent
Hochgraf

(10) Patent No.: US 6,603,290 B2
(45) Date of Patent: Aug. 5, 2003

(54) ANTI-ISLANDING DETECTION SCHEME FOR DISTRIBUTED POWER GENERATION

(75) Inventor: Clark Glenn Hochgraf, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 51 days.

(21) Appl. No.: 09/995,325

(22) Filed: Nov. 26, 2001

(65) Prior Publication Data

US 2003/0098671 A1 May 29, 2003

(51) Int. Cl.[7] .................................................. H02J 3/00
(52) U.S. Cl. ............................. 322/37; 322/36; 307/32
(58) Field of Search ............................. 322/12, 22, 36, 322/37; 307/31, 32

(56) References Cited

U.S. PATENT DOCUMENTS 3,673,422 A * 6/1972 Parke ......................... 307/87
3,942,032 A * 3/1976 Casazza ...................... 307/148
4,541,058 A * 9/1985 Andow et al. .............. 700/294
5,198,745 A * 3/1993 Larsen et al. ................ 322/58
5,345,375 A * 9/1994 Mohan ........................ 363/40
5,448,167 A * 9/1995 Takagi ........................ 324/177
5,473,528 A * 12/1995 Hirata et al. ................. 363/71
5,686,766 A * 11/1997 Tamechika .................. 307/43
5,731,965 A * 3/1998 Cheng et al. ................ 363/41
2002/0005668 A1 * 1/2002 Couture ...................... 307/98

* cited by examiner

*Primary Examiner*—Nicholas Ponomarenko
(74) *Attorney, Agent, or Firm*—John I. Kajander

(57) ABSTRACT

An arrangement is provided for detecting the occurrence of an islanding condition in the connection of a distributed power generation source to an electrical power system or utility. In accordance with the present invention, a voltage or current signal is injected into the system, and the resulting system impedance is determined. The resulting determination is used as an indicator of the islanding condition. The detection arrangement allows the detection of islanding conditions even when the load is well matched to the generated power.

19 Claims, 1 Drawing Sheet

24
30
SYSTEM
10
Va, Ia
Vb, Ib
Vc, Ic
27
26B
26A
26C
SIGNAL INJECTOR
IMPEDANCE CALCULATION
28
THRESHOLD COMPARISON, RATE OF CHANGE
34
POWER GENERATOR
Va*
Vb*
Vc*
32
22

ANTI-ISLANDING DETECTION SCHEME FOR DISTRIBUTED POWER GENERATION

BACKGROUND OF THE INVENTION

1. Field of the Invention

The present invention relates to arrangements for detecting islanding conditions in an electrical power distribution system.

2. Background Art

In electric utility systems, an open circuit condition can cause the creation of an "island" of electrical load and generation. These conditions are undesirable and of a particular concern in distributed power generation systems having generation and loads coexisting on a distribution feeder. The island can result in an abnormal voltage or frequency being supplied to the load.

Islanding detection arrangements typically operate by detecting under/over-voltage conditions and/or under/over-frequency conditions in a distribution grid. Typical arrangements either detect whether a generator speed has increased or decreased due to power imbalance, or detect whether the generator voltage is too high or low as a result of either the real or reactive power of the generator not matching the loads placed thereon.

Most detection arrangements, like the foregoing, are generally limited to those conditions in which a distributed power generator is unable to support a load.

Moreover, these arrangements tend to be effective only when the load is significantly different than the generator power. Accordingly, when a load is well matched to the generator's output, most detection arrangements tend to experience difficulties in detecting an islanded load. As such, a need exists for an improved islanding detection arrangement that can detect open circuit conditions even when a load is well matched to a generator power output.

SUMMARY OF THE INVENTION

Accordingly, the present invention provides an anti-islanding arrangement for detecting an impedance of a power grid. The arrangement provides an indication of changes in the grid impedance that are indicative of islanding or open-phase conditions.

In accordance with one aspect of the present invention, a signal is injected into the grid so that the resulting impedance response can be measured. If the magnitude or phase angle of the measured impedance on any phase exceeds a predetermined threshold or deviates from a desired range, an open phase or islanding condition can be indicated.

In accordance with another aspect of the present invention, an arrangement is provided for detecting an islanding condition in an electrical power supply system that includes a central power generator for providing electrical power, at least one distributed power generator for operating as a local source of electrical power for a localized load, and a feeder network coupled to the central power generator and the at least one distributed power generator for providing electrical power to the localized load. A signal injector is connected to the power supply system for injecting a signal into each phase of the generated power so that an impedance calculator connected to the power supply system can determine the resulting system impedance. A controller then can identify the occurrence of an islanding condition based on a determination made by a comparator arranged to compare the determined system impedance with a predetermined threshold.

Thus, the present invention advantageously allows detection of islanding conditions when the load is well matched to the generator power.

DETAILED DESCRIPTION OF THE PREFERRED EMBODIMENT(S)

Figure 1:
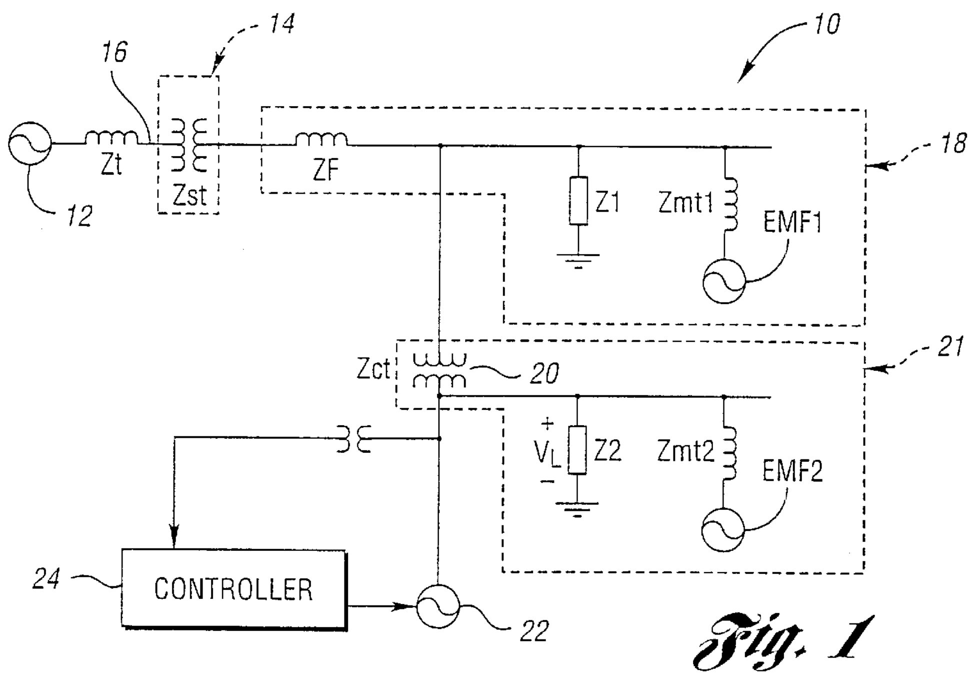
FIG. 1 is a circuit diagram representing a distributed electrical power supply system in accordance with the present invention.

FIG. 1 illustrates a simplified circuit model of an electrical power distribution system 10 in accordance with the present invention. The system 10 includes a central generator or power plant 12 connected to a utility substation 14 via a power transmission line 16. The substation 14 includes a transformer denoted as Zst. From the substation 14, a radial feeder (denoted generally as 18) carries electrical power to one or more customer stepdown transformers 20 at a customer site 21. Feeder 18 includes a load component Z1 (generally on R,L,C type load), a feeder motor load transient reactance component Zmt1, and a motor back EMF component EMF1. Likewise, the customer site 21 includes a local load component Z2 (generally a R,L,C type load), a local motor load transient reactance component Zmt2, and a motor back EMF component EMF2. A distributed power generator 22 and associated controller 24 are connected to the customer transformer 20.

In order to provide adequate voltage on the feeder 18 to drive customer loads Z2, the per unit or normalized voltage drop across each of transformer Zst, feeder 18, and load transformer 20 must be significantly smaller than a load voltage $V_L$. As such the feeder 18 impedance plus transformer Zst impedance (Zf+Zst) should be much smaller than the local load impedance Z2. This can be accomplished when the impedances of the power grid source are expressed as a short circuit ratio which is typically greater than a factor of 10, and greater than a factor of 1000 for stiff power systems. In other words, the lowest load impedance Z2 is at least 10 times higher than the equivalent source impedance (Zt+Zst+Zf) of the grid.

Figure 2:
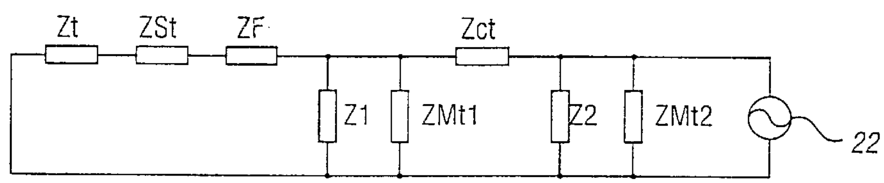
FIG. 2 is an equivalent impedance circuit as seen by the distributed power generator.

FIG. 2 is a circuit representation of the equivalent impedances seen by the distributed power generator 22. As shown, the sum of the transmission system impedance Zt, the substation impedance Zst, and the feeder impedance Zf is many times smaller than the parallel combination of the local load impedance Z2 and the local motor transient reactance Zmt2 in series with the customer transformer impedance Zct and in parallel with the aggregate load impedance Z1 and aggregate motor transient reactance Zmt1. Thus, if the feeder 18 connection to the substation 14 becomes open, the equivalent impedance seen by the distributed generator 22 will increase substantially.

In accordance with the present invention, the grid impedance is therefore used as an indicator to differentiate between islanded loads and loads that are still connected to the substation 14. As described below, a low impedance is indicative that the line is still connected to the substation 14, and a high impedance is indicative that an open circuit condition has isolated the load impedance.

Figure 3:
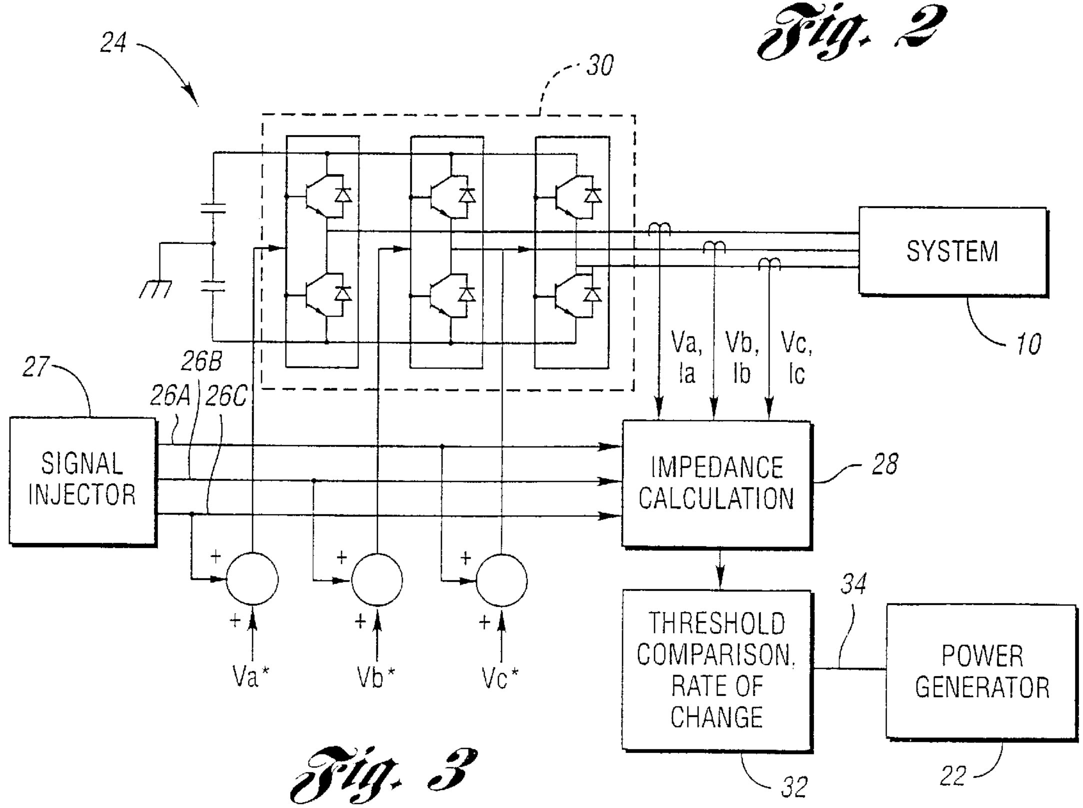
FIG. 3 is block circuit diagram of an islanding detection arrangement in accordance with the present invention.

More specifically, the impedance on each phase can be analyzed so that single-phase open circuit conditions can be detected even if three-phase motor loads are present. As shown in FIG. 3, voltage or current signals 26A, 26B, 26C, are injected on each phase by a signal injector 27 and the corresponding grid response is determined and analyzed. Injection of the signals is represented by summing each signal with each phase's fundamental voltage Va*, Vb*, and Vc*. An impedance calculation process 28 utilizes ratios of voltage and current for each phase, i.e., Va/Ia, Vb/Ib, and Vc/Ic, such as fed from an inverter network 30, to determine |Z| and/or angle Z. The calculated impedance or angle is compared in a comparison process 32 to a predetermined value range, or rate of change to determine whether an islanding condition exists. Processes 27, 28 and 32 can be carried out by controller 24, or other control processor coupled to the distribution system. If so, a signal 34 for disconnect can be provided to or from controller 24 to disconnect the distributed power generator 22 from feeder 18.

The injected signal may take the form of a fundamental power-frequency voltage injected to produce either real or reactive power flow, or a combination thereof. The injected signal may consist of harmonics of the fundamental frequency, possibly with different phase angles on each phase. The injected signal may also be non-harmonically related to the fundamental frequency. A low amplitude of the injected signal is desirable to prevent voltage flicker or other disturbances.

A high quality estimate of the impedance can be achieved with a low amplitude injection signal by the use of high quality modulation/demodulation filters. A pseudo-random injected signal with matching filter can be used so that the injected signal is unobtrusive.

The 26A, 26B, and 26C signal can be injected at any point in the power distribution system, such as in the feeder network or locally at the customer site. Injection of the voltage or current signal does not have to be continuous. The signal may be injected near the zero crossings of the voltage or at some other point antecedent basis to minimize interference, distortion, or saturation.

In addition, an adaptive filter arrangement can be used having a threshold adjustable across an acceptable range of grid impedances so that the filter can adjust for changes in feeder configuration over time.

While the best mode for carrying out the invention has been described in detail, those familiar with the art to which this invention relates will recognize various alternative designs and embodiments for practicing the invention as defined by the following claims.

What is claimed is:

1. A method of detecting an open circuit condition in an electrical system for power supply from a central generator and distributed power generator to a load, the method comprising:

injecting a signal into the system;

determining a system impedance in response to the injected signal;

comparing the determined system impedance with a predetermined threshold; and identifying an occurrence of an open circuit or abnormal condition based on the comparison.

2. The method of claim 1, wherein the signal is injected on one phase of the supplied power.

3. The method of claim 1, wherein the signal is injected on multiple phases of the supplied power.

4. The method of claim 2 wherein the signal is injected on each phase of the supplied power with a different phase angle for each phase.

5. The method of claim 1 wherein injecting a signal comprises injecting a fundamental power-frequency voltage to produce a real power flow.

6. The method of claim 5 wherein the injected signal comprises harmonics of the fundamental power-frequency.

7. The method of claim 1, wherein the injected signal comprises harmonics not harmonically related to the fundamental power frequency.

8. The method of claim 1 wherein injecting a signal comprises injecting a fundamental power-frequency voltage to produce a reactive power flow.

9. The method of claim 1 wherein comparing the determined impedance comprises comparing an impedance magnitude with a threshold value.

10. The method of claim 1 wherein comparing the determined impedance comprises comparing an impedance angle with a threshold value.

11. The method of claim 1 wherein the signal is intermittently injected.

12. The method of claim 1 wherein the signal is injected at a point relative to a signal waveform to minimize interference, distortion, or saturation.

13. A system for detecting an open circuit condition in an electrical power supply system comprising:

a central power generator arranged to generate electrical power;

at least one distributed power generator arranged to operate as a local source of electrical power for a localized load;

a feeder network coupled to the central power generator and the at least one distributed power generator for providing electrical power to the at least one distributed power generator;

a signal injector connected to the power supply system and arranged to inject a signal at each phase of the generated power;

an impedance calculator connected to the power supply system and arranged to determine the system impedance resulting from the injected signal;

a comparator arranged to compare the determined system impedance with a predetermined threshold; and a controller arranged to identify the occurrence of an islanding condition based on the comparison made by the comparator.

14. The system of claim 13 wherein the signal injector is arranged to inject a signal comprising a fundamental power-frequency voltage to produce a real power flow.

15. The system of claim 13 wherein the signal injector is arranged to inject the signal with different phase angles for each phase of the generated power.

16. The system of claim 13 wherein the signal injector is arranged to inject a signal comprising a fundamental power-frequency voltage to produce a reactive power flow.

17. The system of claim 13 wherein the comparator is arranged to compare the calculated impedance magnitude with a threshold value.

18. The system of claim 13 wherein the comparator is arranged to compare the calculated impedance angle with a threshold value.

19. The system of claim 13 wherein the controller is responsive to the comparator to disconnect the at least one distributed power generator from the feeder network if the comparison is indicative of an impedance greater than the threshold.

* * * * *